United States Patent
Lin

(10) Patent No.: US 7,000,103 B2
(45) Date of Patent: Feb. 14, 2006

(54) METHOD FOR UPDATING A SYSTEM BIOS BY READING A BIOS STORED IN AN IDE-INTERFACE CONNECTED TO A HARD DISK DRIVE

(75) Inventor: Mark Lin, Taipei (TW)

(73) Assignee: Inventec Corporation, Taipei (TW)

( * ) Notice: Subject to any disclaimer, the term of this patent is extended or adjusted under 35 U.S.C. 154(b) by 706 days.

(21) Appl. No.: 10/023,729

(22) Filed: Dec. 21, 2001

(65) Prior Publication Data

US 2003/0120908 A1 Jun. 26, 2003

(51) Int. Cl.
*G06F 1/24* (2006.01)
*G06F 15/177* (2006.01)
*G06F 11/00* (2006.01)

(52) U.S. Cl. .......................... 713/100; 713/2; 714/100
(58) Field of Classification Search ................ 713/100, 713/2, 1; 714/100, 5, 6, 7, 15, 23, 36, 38; 710/10, 65, 100
See application file for complete search history.

(56) References Cited

U.S. PATENT DOCUMENTS

| 5,473,775 | A | * | 12/1995 | Sakai et al. | 713/2 |
| 5,574,943 | A | * | 11/1996 | Daftari | 710/1 |
| 6,633,976 | B1 | * | 10/2003 | Stevens | 713/2 |

FOREIGN PATENT DOCUMENTS

JP         11282685  A  *  10/1999

* cited by examiner

*Primary Examiner*—Thomas Lee
*Assistant Examiner*—Suresh K Suryawanshi
(74) *Attorney, Agent, or Firm*—Bacon & Thomas, PLLC

(57) ABSTRACT

The invention is to provide a basic input/output system updating method that divides a memory in an electronic device into a system program area and a boot program area, wherein a basic input/out system (BIOS) program is stored in the said system program area and an initialization sequence is stored in the boot program area. When the initialization sequence in the said system program area is destroyed and the BIOS program is lost, the invention enables a user to toggle a switch to a closed position to connect the said microprocessor to the said boot program area to read the initialization sequence stored therein.

9 Claims, 2 Drawing Sheets

METHOD FOR UPDATING A SYSTEM BIOS BY READING A BIOS STORED IN AN IDE-INTERFACE CONNECTED TO A HARD DISK DRIVE

BACKGROUND OF THE INVENTION

1) Field of the Invention

The invention herein relates to basic input/output system (BIOS) maintenance in electronic devices such as notebook computers, specifically a basic input/output system updating method.

2) Description of the Prior Art

A basic input/output system (BIOS) is typically a section of program code in the read-only memory (ROM) of a mainboard circuit and consists of numerous input/out interface basic control code sequences that are executed as a self-diagnostic operation after a computer power supply is switched on and, furthermore, involves the reading of data (such as hard disk drive size, the presence of an optical drive, and system time, and other similar data) programmed into a complimentary metal oxide semiconductor (CMOS). As such, if the said BIOS is destroyed, the computer system cannot be started up and initialized. However, notebook computers now available on the market all have seamless BIOS protection measures such that when the said BIOS is corrupted and destroyed by virus intrusion or lost due to user-attributed BIOS reconfiguration failure, the said computer system cannot be started up and initialized, which requires repair and results in considerable user inconvenience.

SUMMARY OF THE INVENTION

An objective of the invention herein is to provide a basic input/output system updating method that divides a memory in an electronic device into a system program area and a boot program area, wherein the basic input/output system (BIOS) program is stored in the system program area and an initialization sequence is stored in the boot program area. When the initialization sequence in the system program area is destroyed and the BIOS program is lost, user is able to toggle a switch to a closed position to connect the same microprocessor to the boot program area and read the initialization sequence stored in the boot program area. As such, the microprocessor, during the initialization sequence, activates memory components connected with the electronic device, reads a BIOS program stored in the memory components, and records it into the system program area, thereby circumventing the failure of the electronic device to initialize because the BIOS program was lost from the system program area.

Another objective of the invention herein is to provide a basic input/output system updating method that divides the memory in an electronic device into a system program area and a boot program area, wherein the BIOS program is stored in the system program area and the initialization sequence is stored in the boot program area such that when the system program area is destroyed and the BIOS program is lost, the user toggles a switch to the close deposition to connect the microprocessor to the boot program area to thereby enable the connection of the microprocessor to the boot program area and its reading of the initialization sequence in the boot program area. As such, during the initialization sequence, the microprocessor, during the initialization sequence, activates memory components connected with the electronic device, reads a BIOS program stored in the memory components, and records it into the system program area, thereby circumventing the failure of the electronic device to initialize because the BIOS program was lost from the system program area.

DETAILED DESCRIPTION OF THE INVENTION

Figure 1:
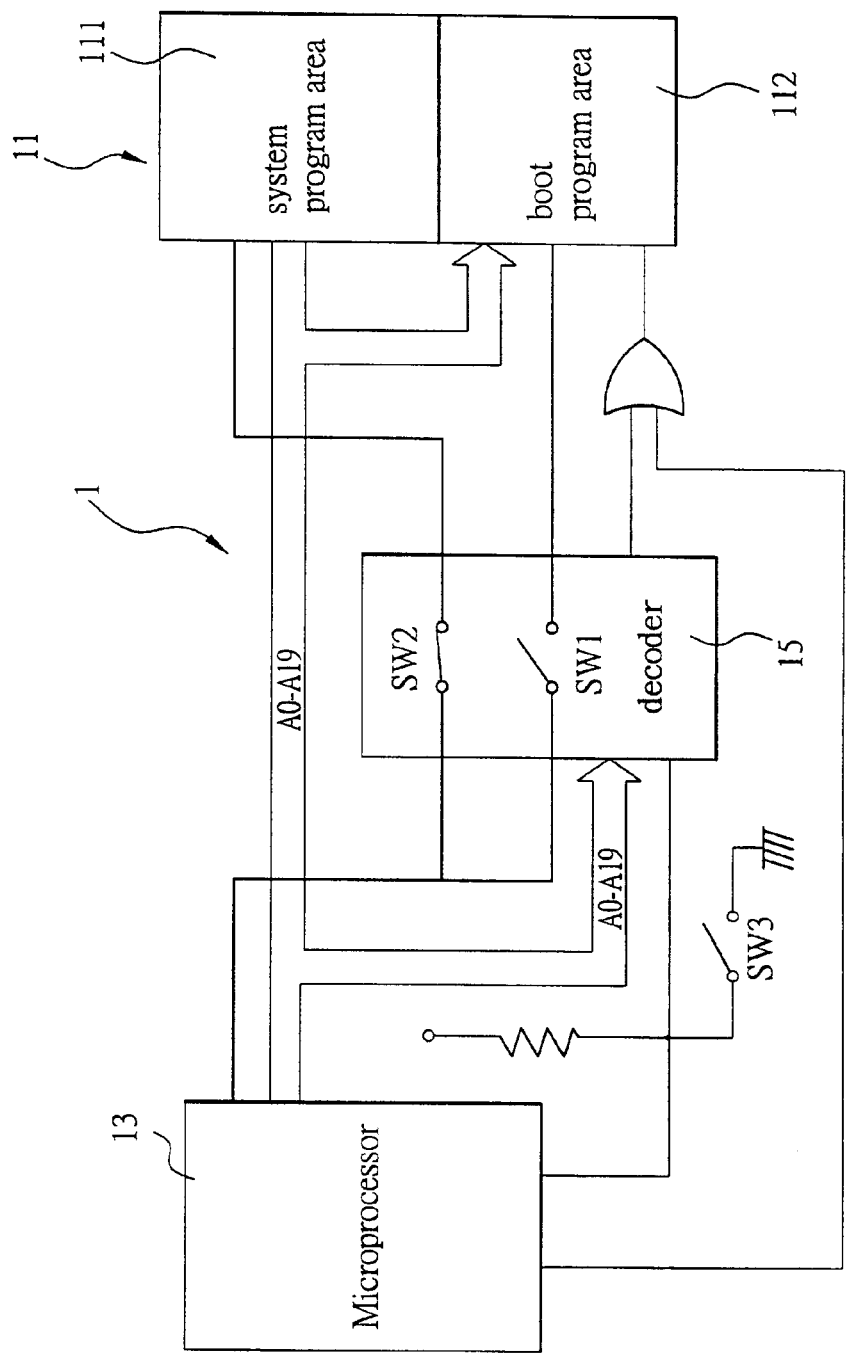
FIG. 1 is a schematic diagram of the invention herein.

The invention herein is a basic input/output system updating method, referring to FIG. 1, that divides a memory 11 in an electronic device 1 (such as a notebook computer) into a system program area 111 and a boot program area 112, wherein the said basic input/out system (BIOS) program is stored in the said system program area 111 such that, when a microprocessor 13 of the said electronic device 1 reads the said program, it executes the system initialization sequence of the said electronic device 1. While the said system program area 111 be destroyed and the BIOS program is lost, the user toggles a switch SW1 to the ON position to connect the said microprocessor 13 to the said boot program area 112 and thereby enable the reading of an initialization sequence stored in the boot program area 112.

In the invention herein, the said microprocessor 13, during the said initialization sequence, activates the hard disk drive connected, reads a BIOS program stored in the hard disk drive, and records the said BIOS read from said hard disk drive into the said system program area 111.

Referring to FIG. 1, the memory 11 of the invention herein is a flash read-only memory (ROM) and the said switch SW1 is a manually operated shunting component that enables the user to toggle the said switch SW1 into a closed state (ON) or an open state (OFF); when the user switches on the power supply of the said electronic device 1, the said microprocessor 13 issues an address signal (such as FFFF0) via a decoder which is sent after decoding to the said system program area and boot program area 111 and 112, thereby enabling the said microprocessor 13 to respectively assign the starting position of the said system program area and boot program area 111 and 112 such that when the user toggles the said switch SW1 to the ON state and brings the said microprocessor 13 into a connection with the said boot program area 112, the said microprocessor 13 reads from the said boot program area 112 and writes into the said boot program area 112; or, when the user toggles the said switch SW1 to the OFF state and thereby establishes a connection between the said microprocessor 13 and the said system program area 111, the said the said microprocessor 13 reads from the said system program area 111 and writes into the said system program area 111.

In the most preferred embodiment of the invention herein, referring to FIG. 1, the said microprocessor 13, during the said initialization sequence, activates the integrated drive electronics (IDE) interface of the said electronic device 1, reads a BIOS program stored in the IDE-interface connected to the hard disk drive, and records the said IDE BIOS into the said system program area 111.

In the embodiment, referring to FIG. 1, the memory 11 of the invention herein is a flash ROM and the switch SW1 is a manually operated component that enables the user to toggle the switch SW1 into a closed state (ON) or an open state (OFF); when the user switches on the power supply of the electronic device 1, the microprocessor 13 issues an address signal (such as FFFF0) via a decoder which, following decoding, is sent to the system program area and boot program area 111 and 112, thereby enabling the microprocessor 13 to respectively assign the starting position of the system program area and boot program area 111 and 112 such that when the user toggles the switch SW1 to the ON state and brings the microprocessor 13 into a connection with the boot program area 112, the microprocessor 13 reads from the boot program area 112 and writes into the boot program area 112; or, when the user toggles the switch SW1 to the OFF state and thereby establishes a connection between the microprocessor 13 and the system program area 111, the microprocessor 13 reads from the system program area 111 and writes into the system program area 111.

In another most preferred embodiment of the invention herein. . . referring to FIG. 1, the said microprocessor 13 links with a local area network (LAN) during the initialization sequence, downloads a BIOS program from the LAN, and records the BIOS downloaded from the LAN into the system program area 111.

In the embodiment, referring to FIG. 1, the memory 11 of the invention herein is flash ROM and the switch SW1 is a manually operated component that enables the user to toggle the switch SW1 into a closed state (ON) or an open state (OFF); when the user switches on the power supply of the electronic device 1, the microprocessor 13 issues an address signal (such as FFFF0) via a decoder which, following decoding, is sent to the system program area and boot program area 111 and 112, thereby enabling the microprocessor 13 to respectively assign the starting position of the system program area and boot program area 111 and 112 such that when the user toggles the switch SW1 to the ON state and brings the microprocessor 13 into a connection with the boot program area 112, the microprocessor 13 reads from the boot program area 112 and writes into the boot program area 112; or, when the user toggles the switch SW1 to the OFF state and thereby establishes a connection between the microprocessor 13 and the system program area 111, the microprocessor 13 reads from the system program area 111 and writes into the system program area 111; in addition, the computer manufacturer can down-load the BIOS through the LAN.

Figure 2:
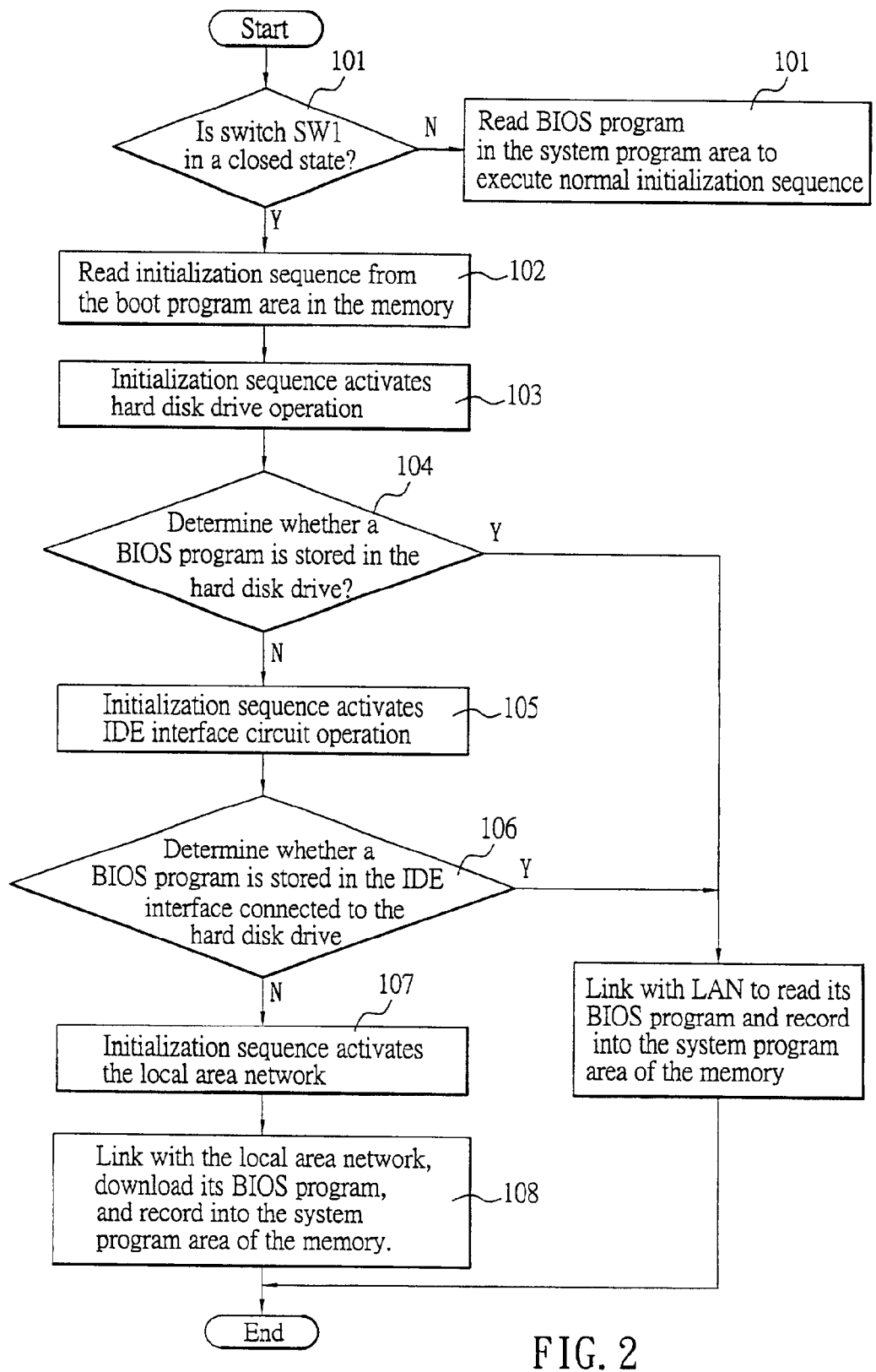
FIG. 2 is a flow chart of the invention herein.

Referring to FIG. 1 and FIG. 2, when the user switches on the electronic device 1, the microprocessor 13 executes the following procedures:

At step 101, a determination is made as to whether the switch SW1 is in the ON state. If the result is affirmative, the next procedure is executed, if the result is negative, then the BIOS program in the system program area 111 of the memory 11 is read to execute the normal initialization routine.

At step 102, the boot program area 112 in the memory 11 is read to preset the initialization sequence.

At step 103, the initialization sequence activates the hard disk drive operation of the said electronic device 1.

At step 104, a determination is made as to whether a BIOS program is stored in the hard disk drive. If the result is affirmative, the BIOS program is read and recorded in the system program area 111 of the memory 11, which concludes the procedure, otherwise, the sequence proceeds to the next step.

At step 105, the initialization sequence activates the IDE interface operation of the said electronic device 1.

At step 106, a determination is made as to whether a BIOS program is present in the IDE interface connected to the hard disk drive. If the result is affirmative, the BIOS program is read and recorded in the system program area 111 of the memory 11, which concludes the procedure; otherwise, the sequence proceeds to the next step.

At step 107, the initialization sequence activates the LAN.

At step 108, linked to the LAN, the BIOS program of the LAN is downloaded and recorded in the system program area 111 of the memory 11, which concludes the sequence.

As such, when the BIOS program is lost from the system program area 111 in the memory 11 of the electronic device 1, the microprocessor 13 can read the BIOS program in the system program area 111 to execute the normal initialization sequence; when the BIOS program of the system program area 111 is destroyed by a computer virus or a user-induced BIOS reconfiguration failure such that the BIOS program is lost from the system program area 111, the microprocessor 13 is capable of reading the initialization sequence from the boot program area 112 to activate the hard disk drive, the IDE interface, and the LAN as well as record the BIOS program previously stored therein to the system program area 111, thereby circumventing the failure of initializing the electronic device 1 because the BIOS program was lost from the system program area 111.

While the invention has been described by means of specific embodiments, numerous modifications and variations could be made thereto by those skilled in the art without departing from the scope and spirit of the invention set forth in the claims.

What is claimed is:

1. A basic input/output system updating method comprising the steps of:
   dividing a memory in an electronic device into a system program area and a boot program area,
   storing a basic input/output system (BIOS) program in said system program area such that when a microprocessor of said electronic device reads said program, said microprocessor executes a system initialization sequence of said electronic device;
   storing an initialization sequence into said boot program area, wherein when said system program area is destroyed and the BIOS program is lost, said microprocessor, connectable to said boot program area via a switch, enables reading of said initialization sequence in said boot program area; and
   wherein said microprocessor during said initialization sequence, activates an integrated drive electronics (IDE) interface of said electronic device, reads a BIOS program stored in said IDE-interface connected to a hard disk drive, and records said BIOS read from said IDE-interface into said system program area.

2. The basic input/output system updating method according to claim 1, wherein said microprocessor, during said initialization sequence, activates the hard disk drive connected to said electronic device, reads said BIOS program stored in said hard disk drive, and records said BIOS into said system program area.

3. The basic input/output system updating method according to claim 1, said microprocessor, during said initialization sequence, links with a local area network (LAN), downloads a BIOS program stored in said LAN, and records said BIOS downloaded from said LAN into said system program area.

4. The basic input/output system updating method according to claim 1, wherein said electronic device is a notebook computer.

5. The basic input/output system updating method according to claim 4, wherein said memory is a flash read-only memory (ROM).

6. The basic input/output system updating method according to claim 4, wherein said switch is a manually operated shunting component.

7. The basic input/output system updating method according to claim 4, wherein when the power supply of said electronic device is switched on, said microprocessor issues an address signal via a decoder which is sent after decoding to said system program area and said boot program area to enable said microprocessor to respectively assign the starting position of said system program area and said boot program area.

8. The basic input/output system updating method according to claim 2, wherein said electronic device is a notebook computer.

9. The basic input/output system updating method according to claim 3, wherein said electronic device is a notebook computer.

* * * * *